(12) United States Patent
Liu et al.

(10) Patent No.: US 9,794,836 B2
(45) Date of Patent: Oct. 17, 2017

(54) METHODS AND APPARATUS FOR DIFFERENCITATING SECURITY CONFIGURATIONS IN A RADIO LOCAL AREA NETWORK

(71) Applicant: Nokia Technologies Oy, Espoo (FI)

(72) Inventors: Yang Liu, Beijing (CN); Da Jiang Zhang, Beijing (CN)

(73) Assignee: Nokia Technologies Oy, Espoo (FI)

( * ) Notice: Subject to any disclaimer, the term of this patent is extended or adjusted under 35 U.S.C. 154(b) by 3 days.

(21) Appl. No.: 14/650,388

(22) PCT Filed: Dec. 24, 2012

(86) PCT No.: PCT/CN2012/087271
§ 371 (c)(1),
(2) Date: Jun. 8, 2015

(87) PCT Pub. No.: WO2014/100929
PCT Pub. Date: Jul. 3, 2014

(65) Prior Publication Data
US 2015/0319652 A1 Nov. 5, 2015

(51) Int. Cl.
*H04W 12/04* (2009.01)
*H04W 36/00* (2009.01)
(Continued)

(52) U.S. Cl.
CPC ....... *H04W 36/0038* (2013.01); *H04L 9/0869* (2013.01); *H04W 12/04* (2013.01); *H04L 2463/061* (2013.01); *H04W 36/08* (2013.01)

(58) Field of Classification Search
CPC . H04W 12/04; H04L 9/0869; H04L 2463/061
(Continued)

(56) References Cited

U.S. PATENT DOCUMENTS

2010/0208692 A1* 8/2010 Kang ................ H04W 36/0055
370/331
2011/0249651 A1* 10/2011 Kang ................ H04W 36/0033
370/331
(Continued)

FOREIGN PATENT DOCUMENTS

CN 101499899 A 8/2009
CN 101946535 A 1/2011
(Continued)

OTHER PUBLICATIONS

International Search Report and Written Opinion received for corresponding Patent Cooperation Treaty Application No. PCT/CN2012/087271, dated Feb. 7, 2013, 15 pages.
(Continued)

Primary Examiner — Marcus Hammonds
(74) Attorney, Agent, or Firm — Mintz Levin Cohn Ferris Glovsky and Popeo, P.C.

(57) ABSTRACT

Methods and apparatus are provided for differentiating security configurations in a radio local area network. A method can comprises: at a base station, sending a handover request to a local access point for initiating a handover of a user equipment from the base station to the local access point, the handover request comprising an indication of a scheme of security configuration to be used for protecting a communication between the base station and the user equipment. The method can further comprise, at the base station, forwarding to the user equipment a handover command received from the local access point, wherein the indication is comprised in the handover command by the local access point. The method can further comprise communicating with the user equipment according to the scheme of security configuration after the user equipment is handover to the local access point.

20 Claims, 6 Drawing Sheets

(51) Int. Cl.
*H04L 9/08* (2006.01)
*H04W 36/08* (2009.01)

(58) Field of Classification Search
USPC .............. 455/410, 436–444; 370/331–334
See application file for complete search history.

(56) References Cited

U.S. PATENT DOCUMENTS

| | | |
|---|---|---|
| 2011/0274085 A1 | 11/2011 | Geary et al. |
| 2012/0008776 A1* | 1/2012 | Ishida .................. H04W 12/04 380/247 |
| 2013/0143532 A1* | 6/2013 | Liu ...................... H04W 12/04 455/411 |

FOREIGN PATENT DOCUMENTS

| | | |
|---|---|---|
| CN | 102215539 A | 10/2011 |
| WO | WO-2011160059 A1 | 12/2011 |
| WO | WO-2012025158 A1 | 3/2012 |

OTHER PUBLICATIONS

NEC, "Handover Optimization". 3GPP Draft R3-092795 Handover Optimization, 3GPP TSG-RAN WG3 Meeting #66, Jeju, Korea. Nov. 9-13, 2009. pp. 1-4.

\* cited by examiner

METHODS AND APPARATUS FOR DIFFERENCITATING SECURITY CONFIGURATIONS IN A RADIO LOCAL AREA NETWORK

RELATED APPLICATION

This application was originally filed as Patent Cooperation Treaty Application No. PCT/CN2012/087271 filed Dec. 24, 2012.

FIELD OF THE INVENTION

The present invention generally relates to wireless communication technology. More specifically, the invention relates to methods and apparatus for differentiating security configurations in a radio local area network.

BACKGROUND

With the development of the future service, next generation wireless communication systems, such as 3GPP (third Generation Partnership Project) LTE (long term evolution) and beyond system, IMT-A (International Mobile Telecommunications-Advanced) system etc are introduced to satisfy high speed, large capacity, and a high QoS (Quality of Service) for billions of subscribers. A radio local area network for heterogeneous network architecture is deployed by the next generation wireless communication systems, to provide large capacity with an offload of the core network. For example, a technology of LTE-LAN (Long Term Evolution-Local Area Network)/LTE-Hi (LTE evolution for Hotspot and Indoor) is proposed to enhance the LTE local area. This kind of radio local area network may be connected to the core network through a radio access network of an associated base station (such as an eNB). In this instance, there's no direct interface between the radio local area network and the core network. When a user equipment (such as a mobile station) is working under such radio local area network, it can access local communication services supported by an access point (AP) of the radio local area network, without involving the radio access network and the core network (which can be collectively called as Evolved Packet System (EPS) network). Furthermore, the user equipment can also access EPS services supported by the associated base station, via the access point. Details of this kind of heterogeneous network architecture will be introduced later with reference to FIG. 1.

SOME EXAMPLE EMBODIMENTS

In heterogeneous network architecture, the security mechanism of the radio local area network can be independent from the EPS network. In this regard, the security keys of the radio local area network will be used to guarantee the security of the radio local area network, while EPS security keys will be used to protect data in the EPS network in a separate way. For example, an access point of the radio local area network may be not designed to derive any security keys used in the radio access network of the associated base station, which means that the secured data from the associated eNB to a user equipment which is working under the access point is transparent to the access point. In this case, the access point only acts as a routing node for the EPS service and also provides air interface resources for a radio local area access.

When there is a handover from a base station to a local access point under the base station, according to current specifications, a handover command message should be generated in the local access point. Furthermore, it is specified that information of security keys to be used when the user equipment is handover to the local access point should be included in the handover command message. Since the security mechanism of the radio local area network is independent from the EPS network, the handover command is also transparent to the base station and the base station will forward the whole handover command directly to the user equipment. After the handover, the user equipment can access to the access point, and the local communication services (if any) between the user equipment and the access point will be protected based on the local security keys. EPS traffics between the user equipment and the associated base station which go through the access point will be protected based on EPS security keys. However, currently there is no method proposed to inform the user equipment during the handover what EPS security keys are going to be used when the access point (where the handover command is generated) is not utilizing an EPS security mechanism, with less modification to related specifications.

Then, it is desirable to find a feasible (e.g. backward compatible) way to inform a user equipment during the handover what EPS security keys are going to be used after the user equipment is handover to a radio local area network.

To overcome limitations described above, and to overcome other limitations that will be apparent upon reading and understanding the present specification, the disclosure provides an approach for informing EPS security configurations in radio local area networks for EPS services.

According to one embodiment, a method comprises, at a base station, sending a handover request to a local access point for initiating a handover of a user equipment from the base station to the local access point, the handover request comprising an indication of a scheme of security configuration to be used for protecting a communication (such as an EPS communication) between the base station and the user equipment. The method further comprises, at the base station, forwarding to the user equipment a handover command received from the local access point, wherein the indication is comprised in the handover command by the local access point when generating the handover command. The method further comprises communicating with the user equipment according to the scheme of security configuration after the user equipment is handover to the local access point.

In some exemplary embodiments, the indication of a scheme of security configuration can indicate that security keys for protecting the communication will not be changed. For example, the indication can comprise an indication bit.

In some exemplary embodiments, the indication of a scheme of security configuration can indicate that security keys for protecting the communication will be updated. For example, the indication comprises a random number for generating the updated security keys. Then, the method can further comprise deriving the updated security keys using the random number. For example, the updated security keys can be derived at least based on original security keys for protecting the communication, the random number, and the length of the random number.

In an exemplary embodiment, the method can further comprise determining the scheme of security configuration.

In an exemplary embodiment, the base station can be a macro evolved Node B, and the local access point is an LTE-LAN (Long Term Evolution-Local Area Network) access point or a LTE-Hi (LTE evolution for Hotspot and Indoor) access point connected to an evolved packet core network through the macro evolved Node B.

In some exemplary embodiments, a security mechanism of communications between the user terminal and the base station can be independent from a security mechanism of communications between the user terminal and the local access point.

According to another embodiment, an apparatus comprising at least one processor, and at least one memory including computer program code, the at least one memory and the computer program code configured to, with the at least one processor, cause, at least in part, the apparatus to send at a base station, a handover request to a local access point for initiating a handover of a user equipment from the base station to the local access point, the handover request comprising an indication of a scheme of security configuration to be used for protecting a communication (such as an EPS communication) between the base station and the user equipment. The apparatus is further caused to forward, at the base station, to the user equipment a handover command received from the local access point, wherein the indication is comprised in the handover command by the local access point when generating the handover command. The apparatus is further caused to communicate with the user equipment according to the scheme of security configuration after the user equipment is handover to the local access point.

According to another embodiment, a computer-readable storage medium carrying one or more sequences of one or more instructions which, when executed by one or more processors, cause, at least in part, an apparatus to send at a base station, a handover request to a local access point for initiating a handover of a user equipment from the base station to the local access point, the handover request comprising an indication of a scheme of security configuration to be used for protecting a communication (such as an EPS communication) between the base station and the user equipment. The apparatus is further caused to forward, at the base station, to the user equipment a handover command received from the local access point, wherein the indication is comprised in the handover command by the local access point when generating the handover command. The apparatus is further caused to communicate with the user equipment according to the scheme of security configuration after the user equipment is handover to the local access point.

According to another embodiment, an apparatus comprises means for sending at a base station, a handover request to a local access point for initiating a handover of a user equipment from the base station to the local access point, the handover request comprising an indication of a scheme of security configuration to be used for protecting a communication (such as an EPS communication) between the base station and the user equipment. The apparatus also comprises means for forwarding at the base station, to the user equipment a handover command received from the local access point, wherein the indication is comprised in the handover command by the local access point when generating the handover command. The apparatus also comprises means for communicating with the user equipment according to the scheme of security configuration after the user equipment is handover to the local access point.

According to one embodiment, a method comprises, at an user equipment, receiving a handover command from a base station for handover the user equipment from the base station to a local access point. The method further comprises identifying an indication comprised in the handover command to determine a scheme of security configuration to be used for protecting a communication (such as an EPS communication) between the base station and the user equipment. The method further comprises communicating with the base station according to the determined scheme of security configuration after the user equipment is handover to the local access point.

In an exemplary embodiment, in an instance in which the indication comprises an indication bit, it can be determined that security keys for protecting the communication will not be changed.

In an exemplary embodiment, in an instance in which the indication comprises a random number, it can be determined that security keys for protecting the communication will be updated. Then, the method can further comprise deriving updated security keys using the random number. For example, the updated security keys can be derived at least based on original security keys for protecting the communication, the random, and the length of the random number.

In an exemplary embodiment, the method can further comprise detecting a local access point; and sending a measurement report about the local access point to the base station, wherein the handover command is received in response to the measurement report.

According to another embodiment, an apparatus comprising at least one processor, and at least one memory including computer program code, the at least one memory and the computer program code configured to, with the at least one processor, cause, at least in part, the apparatus to receive, at an user equipment, a handover command from a base station for handover the user equipment from the base station to a local access point. The apparatus is further caused to identify an indication comprised in the handover command to determine a scheme of security configuration to be used for protecting a communication (such as an EPS communication) between the base station and the user equipment. The apparatus is further caused to communicate with the base station according to the determined scheme of security configuration after the user equipment is handover to the local access point.

According to another embodiment, a computer-readable storage medium carrying one or more sequences of one or more instructions which, when executed by one or more processors, cause, at least in part, an apparatus to receive, at an user equipment, a handover command from a base station for handover the user equipment from the base station to a local access point. The apparatus is further caused to identify an indication comprised in the handover command to determine a scheme of security configuration to be used for protecting a communication (such as an EPS communication) between the base station and the user equipment. The apparatus is further caused to communicate with the base station according to the determined scheme of security configuration after the user equipment is handover to the local access point.

According to another embodiment, an apparatus comprises means for receiving a handover command from a base station for handover the user equipment from the base station to a local access point. The apparatus further comprise means for identifying an indication comprised in the handover command to determine a scheme of security configuration to be used for protecting a communication (such as an EPS communication) between the base station and the user equipment. The apparatus further comprise means for communicating with the base station according to the determined scheme of security configuration after the user equipment is handover to the local access point.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Figure 1:
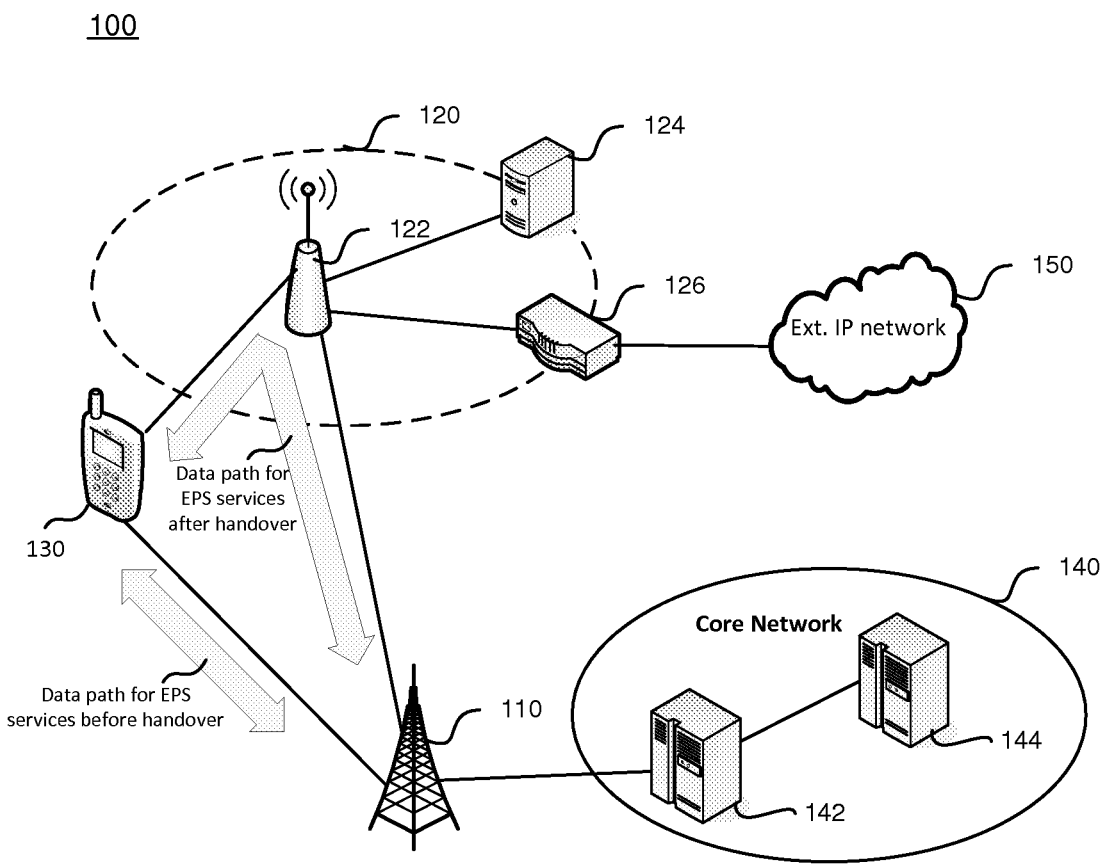
FIG. 1 is a wireless communication system in which at least one embodiment of the present invention can be implemented.

Examples of a method, apparatus, and computer program for providing secure communications based on a trust level in a distributed manner are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention. Like reference numerals refer to like elements throughout.

FIG. 1 is a wireless communication system in which at least one embodiment of the present invention can be implemented. As shown in FIG. 1, the system 100 can comprise a base station 110 supporting cellular communication services such as EPS(Evolved Packet System) services, and a coverage area (not shown) which can be referred to as a macro cell. The base station 110 is also capable of communicating with wireless devices, such as user equipment 130 and a local access point 122, within the coverage area. Although FIG. 1 depicts one base station 110, one user equipment 130, and one local access point 122, other quantities of base stations, user equipments and local access points may be implemented as well.

In some implementations, the base station 110 can be implemented as an evolved Node B (eNB) type base station consistent with standards, including the Long Term Evolution (LTE) standards. The user equipment 130 may be referred to as, for example, devices, mobile stations, mobile units, subscriber stations, wireless terminals, terminals, or the like. The user equipment may be implemented as, for example, a wireless handheld device, a wireless plug-in accessory, or the like. For example, the user equipment may take the form of a wireless phone, a computer with a wireless connection to a network, or the like. In some cases, the user equipment may include one or more of the following: at least one processor, at least one computer-readable storage medium (e.g., memory, storage, and the like), a radio access mechanism, and a user interface. The base station 110 may be connected to a core network 140, e.g. through a legacy S1 interface. For example, the core network 140 can support functions of an EPC (Evolved Packet Core) network, and can comprise MME(Mobility Management Entity)/S-GW (Serving Gateway) 142, HSS (Home Subscriber Server) 144, and the other conventional network nodes. Network nodes in the core network 140 can be organized in a basic structure and operate in a basic way well known to one skilled in the art.

The system 100 can further comprise a local access point 122 supporting a corresponding local communication services and a coverage area 120, which can be referred to as an AP cell. In some embodiments, the local access point 122 works under an associated base station (such as the base station 110), similar as a sub-system of an eNB. In this sense, the associated eNB can be also referred to as a macro eNB. The local access point 122 can be connected to the core network 140 through a backhaul of the associated base station 110, for example by using a S1-like interface (such as a simplified S1 interface) between the base station 110 and the local access point 122. The associated base station 110 to which the local access point 122 connects can act as a concentrator in a RAN (Radio Access Network) side. When a user equipment is operating under a local access point 122, the user equipment can access local communication services which are supported by the local access point 122, for example through data paths relayed by the local access point 122 without going through the base station 110. For example, the user equipment 130 can access a local IP service by communicating with an external IP network 150 through the local access point 122 and via a local gateway (such as the local "default" gateway 126). Since the local IP service can be supported without involving the base station 110 and the core network 140, the load of the base station 110 and the core network 140 can be reduced significantly. When the user equipment 130 is operating under the local access point 122, it can also access EPS services supported by the base station 110, via the access point 122. The local access point 122 only acts as a routing node for the EPS services, and provides air interface resources for a radio local access.

In some embodiments, the radio local access network 120 including the local access point can be hidden from the core network 140. For example, in an exemplary embodiment, the architecture of the radio local access network 120 can be hidden from the core network 140, by using a S1-like interface between the local access point 122 and its associated base station 110. For a local communication service, the radio local access network 120 can provide means for authenticating and authorizing user equipments. For example, this may be implemented by using similar methods as applied in WLAN (IEEE 802.11i), in which the radio local access network 120 can be deployed by a third-party operator other than the operator of the base station 110 and the core network 140. As such, the local security mechanism used for the radio local area network can be independent from EPS security mechanism used for the EPS network. This can avoid sensitive information of the EPS network being leaked to the radio local area network. In this regard, the local access point can use any independent security mechanism for local services. For example, as shown in FIG. 1, an optional Local Authentication Server 124 can be deployed in the radio local area network 120. The Local Authentication Server 124 may be a RADIUS or Diameter Server similar as that used in an enterprise Wi-Fi(Wireless Fidelity) networks. In some embodiments, even a user equipment do not have a SIM(Subscriber Identity Module) or do not subscribe EPS services with the operator of the EPS network, it may be capable of accessing the local services. For example, a user equipment can be coupled to the local access point through a simplified LTE-Uu interface. The network interfaces between and in the EPS network and the radio local access network, such as the S1-like interfaces, can be implemented according to any suitable protocols or specifications in prior art. In some exemplary implementations, the wireless communication system 100 can be configured to comply substantially with a standard system specification, such as LTE-LAN or LTE-Hi, and/or other wireless standards.

As noted above, after a user equipment 130 is handover from an associated base station 110 to a local access point 120, there may be still EPS services between the user equipment 130 and the base station 110, which go through the local access point 120 as shown in FIG. 1. Such EPS services still needs to be protected with an EPS security mechanism. For example, the EPS services may be protected with keeping the EPS security keys unchanged, or update the EPS security keys with a proposed solution. In various embodiments, a new approach is provided to clearly inform the user equipment which security mechanism is to be used after the handover. Some exemplary embodiments will be illustrated with reference to FIGS. 2 and 3.

Figure 2:
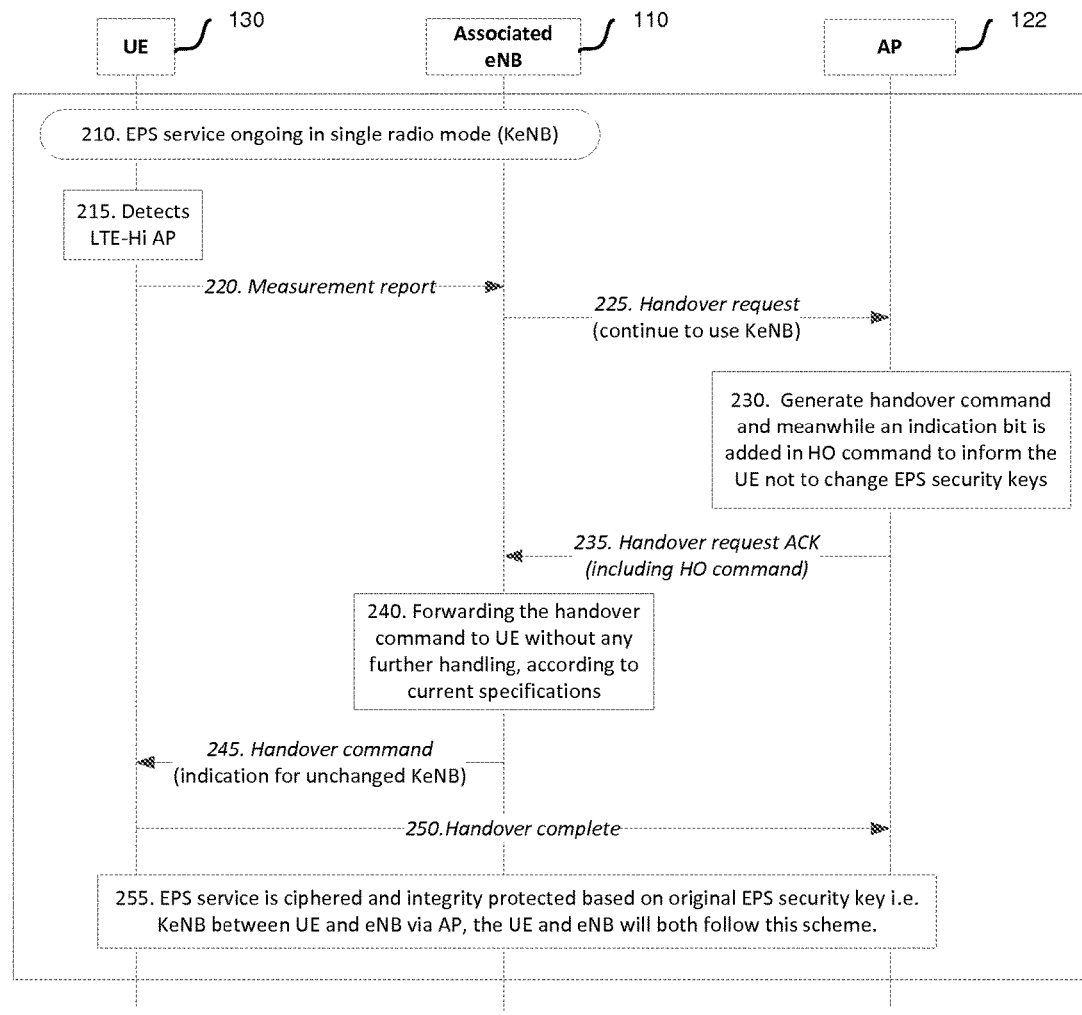
FIG. 2 depicts an example timing diagram illustrating a handover from a macro eNB to a local access point according to an embodiment of the present invention.

FIG. 2 depicts an example timing diagram illustrating a handover from a macro eNB to a local access point according to an embodiment of the present invention. Referring to FIG. 2, at 210, a user equipment 130 (denoted as UE) is connected to an associated base station 110 (denoted as associated eNB) with EPS services ongoing in a single radio mode. The EPS services may be protected with an EPS security key, denoted as $K_{eNB}$. Then, the user equipment 130 may detect a local access point 122 (such as a LTE-Hi AP) at 215, and report the local access point to its associated eNB 110 for example by sending a measurement report to the associated eNB at 220.

In some embodiments, the associated eNB can identify the AP cell supported by this local access point 122, and decide to initiate a handover procedure from itself to the local access point 122, such as an inbound handover. In other embodiments, the decision of the handover may be made by the user equipment or the local access point. When the handover is decided to be initiated, the associated eNB can decide which scheme of security configuration is to be used for protecting EPS services between itself and the user equipment after the handover, and then indicate to this target local access point 122 the scheme of security configuration to be used. In an exemplary embodiment, the associated eNB can decide to protect the EPS services without any EPS security key update, and then send to the local access point 122 a handover request comprising an indication that the current security configuration will not be changed (for example the EPS security key $K_{eNB}$ will be continue to be used), as shown at 225 in FIG. 2. In an exemplary embodiment, the associated eNB 110 can include a security key (e.g. $K_{eNB}$) into the handover request, to indicate there is no change to the EPS security keys. In an exemplary embodiment, the associated eNB 110 can include into the handover request only an indication bit, which can be set to "0" for indicating there is no change to the EPS security keys for example. As such, sensitive information of the EPS services can be avoided to be leaked to the local area. As shown in FIG. 1, the indication of the scheme of security configuration to be used can be indicated to the target local access point via an S1 (or S1-like) interface between the target local access point 122 and the associated eNB 110.

At 230, when the local access point 122 accepts this handover request, it can generate a handover command message. Meanwhile, the indication of the scheme of security configuration received from the associated eNB 110 is also included into this handover command message. For example, as indicated in the corresponding handover request, the local access point 122 can add an indication bit in the handover command message to inform the user equipment not to change the original EPS security keys after the handover. The handover command message can be transmitted to the user equipment, via the associated eNB 110. In an exemplary embodiment, in response to the handover request, the local access point 122 can send to the associated eNB 110 a handover request ACK including the handover command as shown at 235. The associated eNB 110 can thus forward this handover command to the user equipment 130, at 240. As such, the indication of not changing EPS security keys can be issued to the user equipment 130 inside the handover command. For example, the handover command can be forwarded according to related current specifications. As noted previously, the security mechanism of the radio local area network is independent from the security mechanism of the EPS network. It means that the handover command message received from the local access point 122 is essential transparent to the associated base station, and thus the associated base station cannot further handle (e.g. decode, and/or decrypt, and/or read, and/or modify) the handover command. As such, the associated eNB 110 forwards to the user equipment 130 the handover command just as it is, i.e. without any further handling.

The use equipment can receive this handover command from the associated base station as shown at 245. Once the user equipment is handover to the target local access point 122 (for example as indicated by a handover complete message at 250), it can protect the EPS services according to the indicated scheme of security configuration. For example, as indicated at 255, the user equipment 130 and the associated base station 110 will both follow the scheme of unchanging EPS security keys, by ciphering and integrity protecting data and signaling of the EPS services based on the original EPS security key, i.e. $K_{eNB}$.

Figure 3:
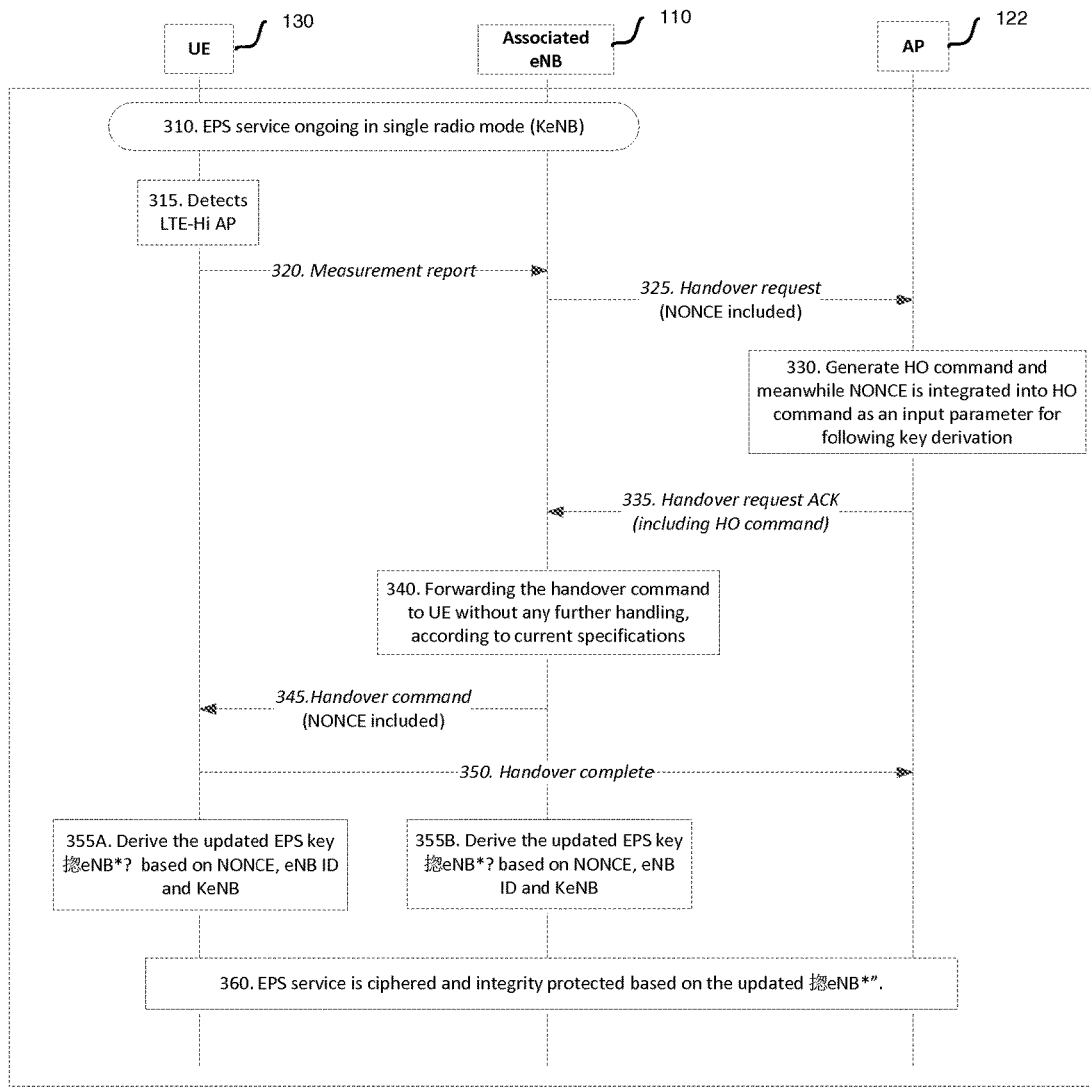
FIG. 3 depicts an example timing diagram illustrating a handover from a macro eNB to a local access point according to another embodiment of the present invention.

FIG. 3 depicts an example timing diagram illustrating a handover from a macro eNB to a local access point according to another embodiment of the present invention. Most steps in the procedure of FIG. 3 are similar as corresponding steps in the procedure of FIG. 2, except that the indicated scheme of security configuration to be used for EPS services after a handover is updating EPS security keys. Specifically, at 310, a UE 130 is connected to an associated eNB 110 with EPS services ongoing in a single radio mode. The EPS services may be protected with an EPS security key, denoted as $K_{eNB}$. Then, the UE 130 may detect a LTE-Hi AP 122 at 315, and report the LTE-Hi AP 122 to its associated eNB 110 for example by sending a measurement report to the associated eNB 110 at 320. Then, the associated eNB 110 can identify the AP cell in of this LTE-Hi AP 122, and decide to initiate a handover procedure with a regular security key update. Then, the associated eNB 110 can indicate to the target LTE-Hi AP 122 that the scheme of security configuration to be used is a regular security key update. In some embodiments, the associated eNB 110 can generate parameters for generating new ESP security keys, such as a random number (which is called NONCE in the KDF) for generating new AS&UP(Access Stratum & User Plane) keys, and then send it to the LTE-Hi AP 122 in a handover request, as shown at 325. As such, sensitive information of the EPS services can be avoided to be leaked to the local area, since the LTE-Hi AP 122 has no knowledge of the EPS security keys.

At 330, when the LTE-Hi AP 122 accepts this handover request, it can generate a handover command message. Meanwhile, the indication of the scheme of security configuration received from the associated eNB 110 is also included into this handover command message. For example, the LTE-Hi AP 122 can include the NONCE received in the handover request at 325 into this handover command message, to provide an input parameter for a following key derivation for UE 130. Further, the including of the NONCE can implicitly indicate that EPS security keys will be changed. As steps 335 to 345, the handover command message can be transmitted to UE 130, via the associated eNB 110. More particular, at 335, in response to the handover request, the LTE-Hi AP 122 can send to the associated eNB 110 a handover request ACK including the handover command, and then at 340, the associated eNB 110 can forward this handover command just as it is to UE 130. As such, the UE 130 can be informed the NONCE and the scheme of changing EPS security keys through the handover command forwarded from eNB 110.

Once UE 110 is handover to the target LTE-Hi AP 122 (for example as indicated by a handover complete message at 350), it can protect EPS services according to the indicated scheme of security configuration. For example, as indicated at 355A, UE 130 can derive an updated EPS key "$K_{eNB}$*" based on the received NONCE. Accordingly, the updated EPS key "$K_{eNB}$*" can also be derived at the associated eNB 110 at 355B. The updated EPS key "$K_{eNB}$*" can be derived through any suitable key derive function. The key derivation function to be used to derive the updated "$K_{eNB}$*" can be also informed to UE 130 by the eNB 110 together with the NONCE. In some embodiments, the updated EPS key "$K_{eNB}$*" can be derived based on the original "$K_{eNB}$", an ID (indentity) of the associated eNB and the NONCE. In some embodiments, the updated EPS key "$K_{eNB}$*" can be derived from the original "$K_{eNB}$", the NONCE and other parameters including a length of the NONCE. In an example key derive function, the "$K_{eNB}$" can be a value of 256 bits, and the NONCE can be a value of 32 bits. Then, an updated EPS key "$K_{eNB}$*" can be derived by using the following parameters as inputs, FC=0×XX (XX should be assigned by specifications of 3GPP),
P0=NONCE,
L0=length of the NONCE (i.e. 0x00 0x04).

Then, as indicated at 360, UE 130 under the LTE-Hi AP 122 will share the updated EPS key with the associated eNB 110, and thus EPS security services can be protected based on the updated EPS security key, i.e. "$K_{eNB}$*". For example, based on the updated EPS key "$K_{eNB}$*", new AS and UP keys can be derived.

Figure 4:
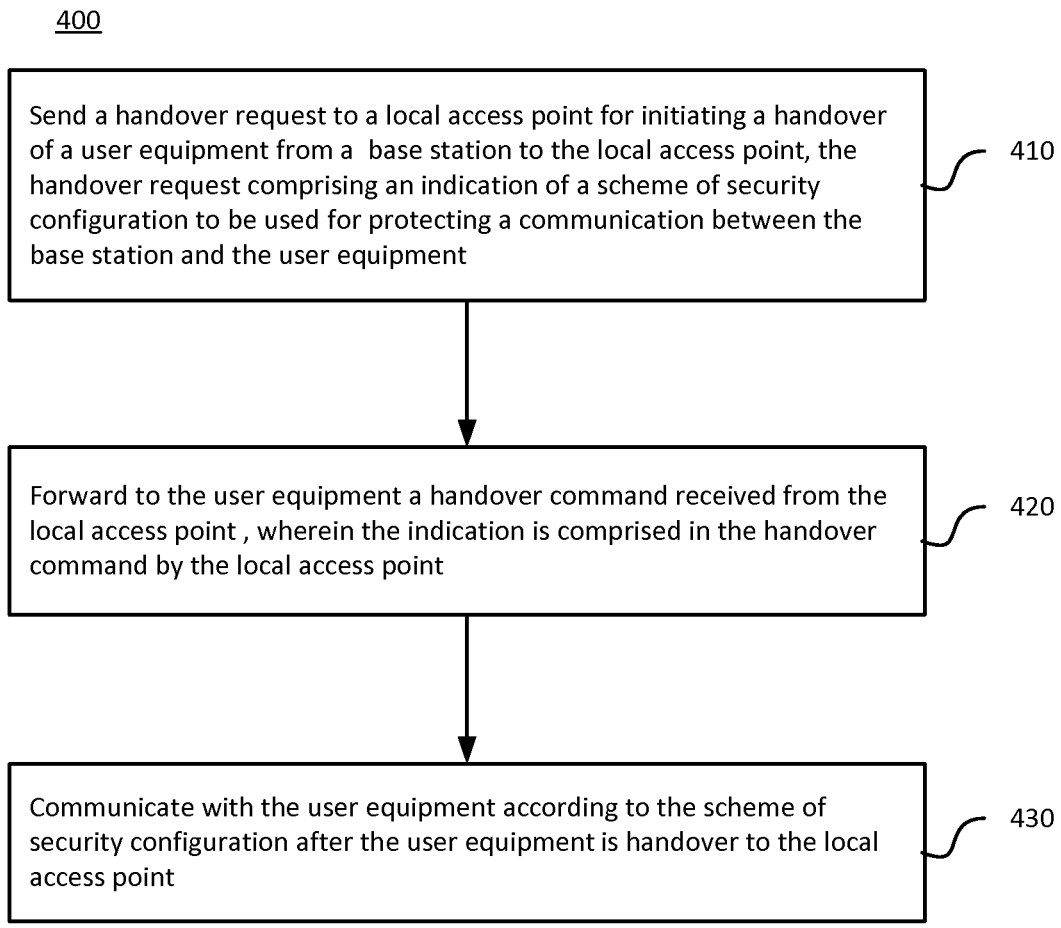
FIG. 4 is a flowchart of a process for informing security configurations of EPS services in a radio local area network, according to one embodiment.
Figure 6:
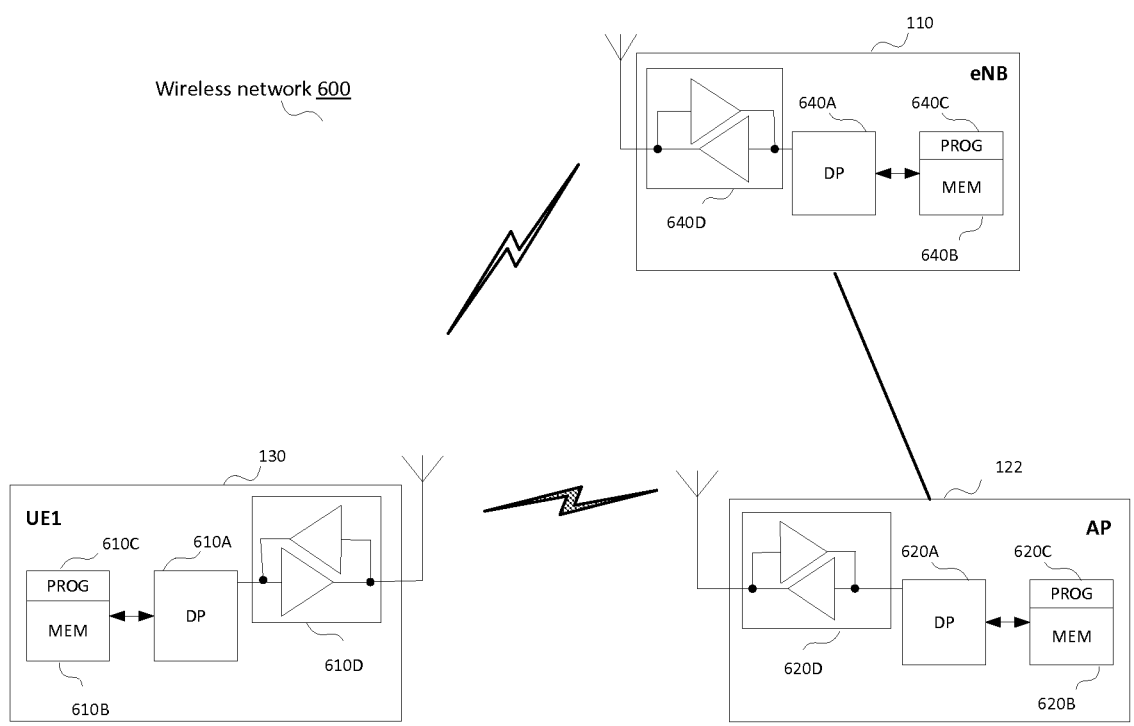
FIG. 6 is a simplified block diagram of various devices that are suitable for use in practicing various exemplary embodiments of the present invention.

FIG. 4 is a logic flow flowchart that illustrates the operations of methods, and a result of executions of computer program instructions, in accordance with the example embodiments of this invention for differentiating security configurations of EPS services in a local area network. More specifically, FIG. 4 is descriptive of a process flow in a base station, such as the eNB 110. In such an embodiment, the process 400 can be implemented in, for instance, a chip set including a processor and a memory as shown in FIG. 6. As such, the base station can provide means for accomplishing various parts of the process 400 as well as means for accomplishing other processes in conjunction with other components.

In step 410, the eNB 110 sends a handover request to a local access point for initiating a handover of a user equipment from the base station to the local access point. The local access point can be a LTE-Hi AP (such as 122) working under the eNB 110. The handover request comprises an indication of a scheme of security configuration to be used for protecting a communication between the base station and the user equipment. In some embodiments, the indication of the scheme of security configuration can indicate that security keys for protecting the communication will not be changed, for example with an indication bit. In some embodiments, the indication of a scheme of security configuration indicates that security keys for protecting the communication will be updated, for example with a NONCE for generating the updated security keys.

In step 420, the eNB 110 forwards to the user equipment a handover command received from the local access point. The indication of the scheme of security configuration is comprised in the handover command by the local access point when generating the handover command.

Next in step 430, the eNB 110 communicates with the user equipment according to the scheme of security configuration, after the user equipment is handover to the local area network served by the local access point. In the instance in which the indication of the scheme of security configuration indicates that security keys for protecting the communication will not be changed, the eNB 110 can use the original security keys for protecting the communication between the eNB 110 and the user equipment. In In the instance in which the indication of a scheme of security configuration indicates that security keys for protecting the communication will be updated, the eNB 110 can derive updated security keys using the random number, and use the updated keys for protecting the communication between the eNB 110 and the user equipment.

Figure 5:
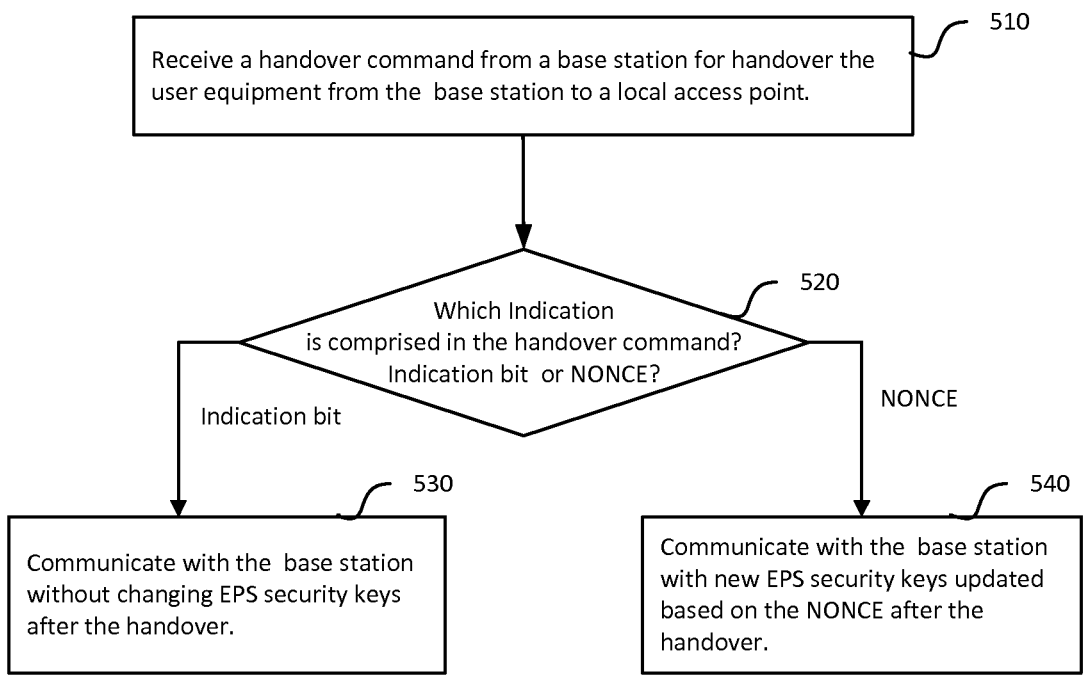
FIG. 5 is a flowchart of a process for differentiating security configurations of EPS services in a radio local area network, according to one embodiment.

FIG. 5 is a logic flow flowchart that illustrates the operations of methods, and a result of executions of computer program instructions, in accordance with the example embodiments of this invention for differentiating security configurations of EPS services in a local area network. More specifically, FIG. 5 is descriptive of a process flow in a user equipment, such as UE 130.

In step 510, the UE 130 receives a handover command from its serving base station (such as the eNB 110). The handover command is configured to direct the UE 130 to handover from the eNB 110 to a local access point (such as a LTE-Hi AP 122 working under the eNB 110).

In step 520, the UE 130 identifies an indication comprised in the handover command to determine a scheme of security configuration to be used for protecting a communication (such as an EPS communication) between the base station and the user equipment. In some embodiments, the UE 130 can identify whether the indication comprised in the handover command is an indication bit or a NONCE. When the indication is an indication bit (which is set as "0", for example), the UE 130 can determine that security keys for protecting the communication will not be changed. Then, as shown in step 530, the UE 130 will communicate with the eNB 110 without changing the security keys after the handover. When the indication is a NONCE, the UE 130 can determine that security keys for protecting the communication will be updated. Then, as shown in step 540, the UE 130 will communicate with the eNB 110 with new security keys updated using the NONCE after the handover.

The various blocks shown in FIGS. 4 and 5 may be viewed as method steps, and/or as operations that result from operation of computer program code, and/or as a plurality of coupled logic circuit elements constructed to carry out the associated function(s).

Now reference is made to FIG. 6 illustrating a simplified block diagram of various electronic devices that are suitable for use in practicing the exemplary embodiments of the present invention.

In FIG. 6, a wireless communication network 600 may be adapted for communication with user equipments (such as UE 130), via a base station (such as an eNB 110). The network 600 may further include infrastructure network control elements (not shown) that provide connectivity with the other network, such as a telephone network and/or a data communications network (e.g., the internet). The infrastructure network control elements can be organized in a basic structure and operate in a basic way well known to one skilled in the art. The UE 130 can be directly connected to a radio access network supported by the eNB 110. Furthermore, the UE 130 can be directly connected to a radio local access network supported by a local access point (such as a LTE-Hi AP 122), and connected to a radio access network via the local access point. The eNB 110 and the UE 130 can differentiate security configurations during a handover from the eNB 110 to the local access point according to the exemplary embodiments of the present invention as discussed above.

The UE 130 includes a data processor (DP) 610A, a memory (MEM) 610B that stores a program (PROG) 610C, and a suitable radio frequency (RF) transceiver 610D for bidirectional wireless communications with the eNB 110 via one or more antennas. In an exemplary embodiment, the transceiver 610D in the UE 130 can be used for communications with the local access point 122. Alternatively, the transceiver 610D can comprise separate components to support communications with the eNB 110 and the local access point 122 respectively.

The local access point (AP) 122 also includes a DP 620A, a MEM 620B that stores a PROG 620C, and a suitable RF transceiver 620D. The eNB 110 also includes a DP 640A, a MEM 640B that stores a PROG 640C, and a suitable RF transceiver 640D.

At least one of the PROGs 610C, 620C, 640C is assumed to include program instructions that, when executed by the associated DP, enable the electronic device to operate in accordance with the exemplary embodiments of this invention, as discussed above. That is, the exemplary embodiments of this invention may be implemented at least in part by computer software executable by the DP 620A of the UE 130, by the DP 620A of the AP 122, and by the DP 640A of the eNB 110, or by hardware, or by a combination of software and hardware. The basic structure and operation of UE 130, AP 122 and eNB 130 are known to one skilled in the art.

In general, the various embodiments of the UE 130 can include, but are not limited to, cellular telephones, personal digital assistants (PDAs) having cellular wireless communication capabilities, portable computers having cellular wireless communication capabilities, image capture devices such as digital cameras having wireless communication capabilities, gaming devices having cellular wireless communication capabilities, music storage and playback appliances having cellular wireless communication capabilities, Internet appliances permitting cellular wireless Internet access and browsing, as well as portable units or terminals that incorporate combinations of such functions.

The MEMs 610B, 620B, 640B may be of any type suitable to the local technical environment and may be implemented using any suitable data storage technology, such as semiconductor based memory devices, flash memory, magnetic memory devices and systems, optical memory devices and systems, fixed memory and removable memory. The DPs 620A, 620A, 640A may be of any type suitable to the local technical environment, and may include one or more of general purpose computers, special purpose computers, microprocessors, digital signal processors (DSPs) and processors based on multi-core processor architectures, as non-limiting examples.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the inventions may be practiced in various components such as integrated circuit chips and modules. It should thus be appreciated that the exemplary embodiments of this invention may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this invention.

It should be appreciated that at least some aspects of the exemplary embodiments of the inventions may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the function of the program modules may be combined or distributed as desired in various embodiments. In addition, the function may be embodied in whole or in part in firmware or hardware equivalents such as integrated circuits, field programmable gate arrays (FPGA), and the like.

The present invention includes any novel feature or combination of features disclosed herein either explicitly or any generalization thereof. Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-Limiting and exemplary embodiments of this invention.

What is claimed is:

1. An apparatus comprising:
at least one processor; and
at least one memory including computer program code, the at least one memory and the computer program code configured to, with the at least one processor, cause the apparatus to perform at least the following:
send, to a target local access point, a request to handover a user equipment from the apparatus to the target local access point, the request comprising an indication of a security configuration to be used for protecting communication between the apparatus and the user equipment after the handover of the user equipment to the target local access point;
forward, to the user equipment, a handover command received from the target local access point, wherein the handover command includes the indication; and
communicate, through the target local access point and after a handover complete message from the user equipment, with the user equipment according to the indicated security configuration.

2. An apparatus of claim 1, wherein the indication indicates at least whether security keys for protecting the communication between the apparatus and the user equipment will be updated.

3. An apparatus of claim 2, wherein communicating with the user equipment through the target local access point comprises providing cellular communication to the user equipment.

4. An apparatus of claim 2, wherein the indication comprises a random number for generating updated security keys when the security keys for protecting the communication between the apparatus and the user equipment will be updated.

5. An apparatus of claim 4, wherein the apparatus is further caused to at least:
derive, based on at least the random number, the updated security keys.

6. An apparatus of claim 5, wherein the updated security keys are further derived based on at least original security keys for protecting the communication between the apparatus and the user equipment and a length of the random number.

7. An apparatus of claim 1, wherein the apparatus is further caused to:
select the security configuration for communication between the apparatus and the user equipment.

8. An apparatus of claim 1, wherein the apparatus comprises and/or is comprised in a macro evolved Node B, and wherein the target local access point is a long term evolution to local area network access point or a long term evolution for hotspot and indoor access point connected to an evolved packet core network through the macro evolved Node B.

9. An apparatus of claim 1, wherein the security configuration for communication between the apparatus and the user terminal after the handover is independent from a second security configuration for concurrent communication between the user terminal and the target local access point after the handover.

10. An apparatus comprising:
at least one processor; and
at least one memory including computer program code, the at least one memory and the computer program code configured to, with the at least one processor, cause the apparatus to perform at least the following:
receive, from a source base station, a handover command to handover the apparatus from the source base station to a target local access point;
determine, based on at least an indication included in the handover command, a security configuration to be used for protecting communication between the source base station and the apparatus after the handover;
transmit, after receipt of the handover command, a handover complete message; and
communicate, through the target local access point and after transmission of the handover complete message, with the source base station according to the determined security configuration.

11. An apparatus of claim 10, wherein the apparatus is further caused to at least:
determine, based on at least the indication, whether security keys for protecting the communication between the source base station and the apparatus will be updated.

12. An apparatus of claim 10, wherein the indication comprises a random number, and wherein the random number indicates that security keys for protecting the communication between the source base station and the apparatus will be updated.

13. An apparatus of claim 12, wherein the apparatus is further caused to at least:
derive, based on at least the random number, updated security keys for communication between the source base station and the apparatus.

14. An apparatus of claim 13, wherein the updated security keys are further derived based on at least original security keys for protecting the communication between the source base station and the apparatus and a length of the random number.

15. A non-transitory computer-readable storage medium carrying one or more sequences of one or more instructions which, when executed by one or more processors, cause an apparatus to at least perform the following:
receive, from a source base station, a handover command to handover the apparatus from the source base station to a target local access point;
determine, based on at least an indication in the handover command, a security configuration to be used for protecting communication between the source base station and the apparatus after the handover;
transmit, after receipt of the handover command, a handover complete message; and
communicate, through the target local access point and after transmission of the handover complete message, with the source base station according to the determined security configuration.

16. A non-transitory computer-readable storage medium of claim 15, wherein the apparatus is further caused to at least:
determine, based on at least the indication, whether security keys for protecting the communication between the source base station and the apparatus will be updated.

17. A non-transitory computer-readable storage medium of claim 15, wherein the indication comprises a random number, and wherein the random number indicates that security keys for protecting the communication between the source base station and the apparatus will be updated.

18. A non-transitory computer-readable storage medium of claim 17, wherein the apparatus is further caused to at least:
   derive, based on at least the random number, updated security keys for communication between the source base station and the apparatus.

19. A non-transitory computer-readable storage medium of claim 18, wherein the updated security keys are further derived based on at least original security keys for protecting the communication between the source base station and the apparatus and a length of the random number.

20. A method comprising:
   sending, via a source first access point, a handover request to a target access point for initiating a handover of a user equipment from the source first access point to the target access point, the handover request comprising an indication of a security configuration to be used for protecting communication between the source access point and the user equipment after the handover of the user equipment to the target access point;
   receiving, via the source access point and in response to the handover request, a handover command from the target access point, the handover command comprising the indication;
   forwarding, via the source access point, the handover command to the user equipment; and
   communicating, via the source access point and after a handover complete message from the user equipment, with the user equipment through the target access point and according to the indicated security configuration.

* * * * *

UNITED STATES PATENT AND TRADEMARK OFFICE
CERTIFICATE OF CORRECTION

PATENT NO.        : 9,794,836 B2
APPLICATION NO.   : 14/650388
DATED             : October 17, 2017
INVENTOR(S)       : Yang Liu et al.

It is certified that error appears in the above-identified patent and that said Letters Patent is hereby corrected as shown below:

On the Title Page

In Column 1, item (54) and in the Specification, Column 1, Lines 1-4, please correct the title to read "METHODS AND APPARATUSES FOR DIFFERENTIATING SECURITY CONFIGURATIONS IN A RADIO LOCAL AREA NETWORK"

Signed and Sealed this
Tenth Day of April, 2018

Andrei Iancu
*Director of the United States Patent and Trademark Office*